July 7, 1959  A. E. KRAMER  2,894,087
VEHICLE ROOF CLEARANCE SIGNAL MEANS
Filed Nov. 19, 1957
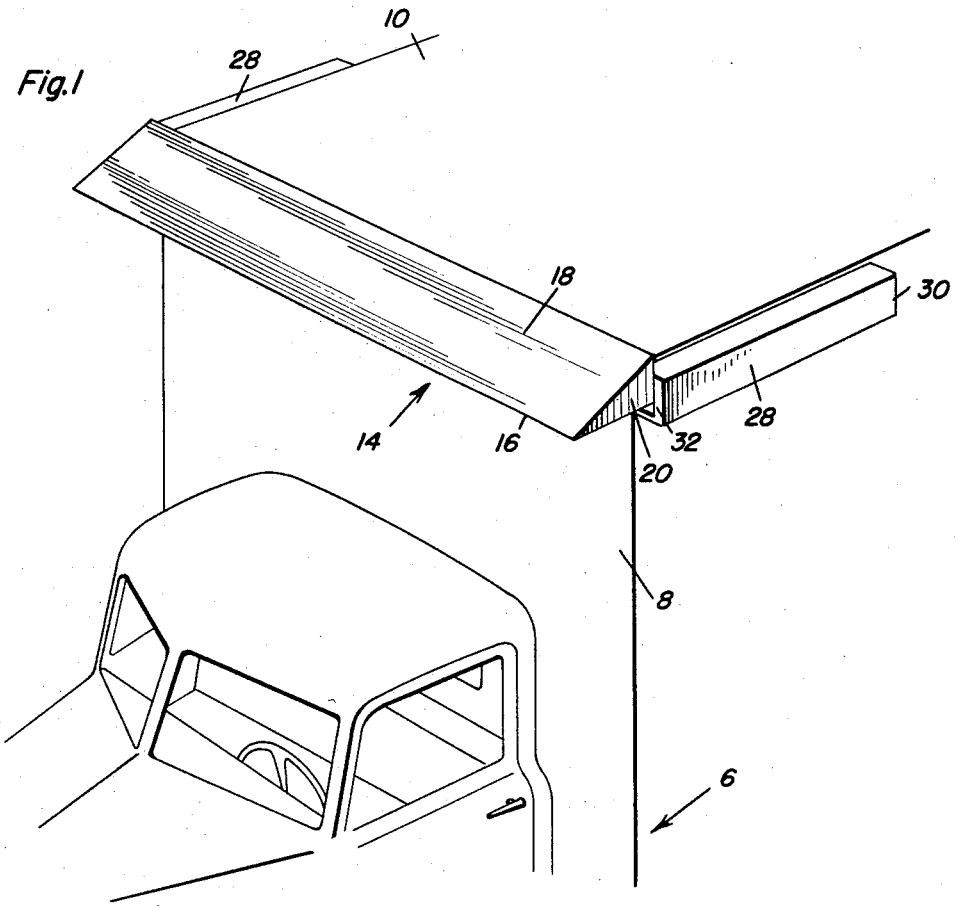
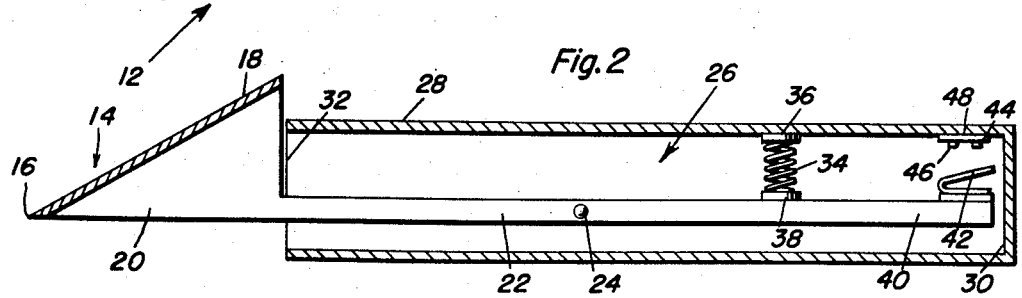
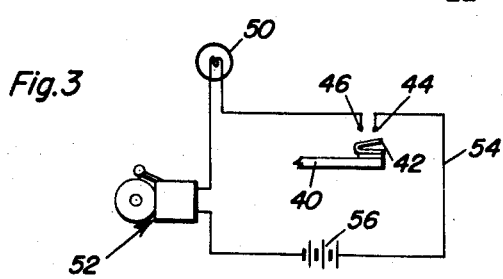
Andrew E. Kramer
INVENTOR.

United States Patent Office 2,894,087
Patented July 7, 1959

2,894,087
VEHICLE ROOF CLEARANCE SIGNAL MEANS
Andrew E. Kramer, Oak Park, Ill.
Application November 19, 1957, Serial No. 697,428
3 Claims. (Cl. 200—61.44)

The present invention relates to signalling and warning means, either audible or visible, which when properly incorporated in the driver's cab will enable the driver to determine with reliability whether his truck or trailer will safely clear beneath an overpass, tunnel or the like.

Although it is customary to reveal the height measurements for truck and trailer clearance requirements, the driver cannot always be too sure of the driving conditions which may be met when close quarters, so to speak, are encountered. For these and other reasons there has long existed the problem which, if solved, would enable a driver to be more sure of his situation in every questionable instance. It is an object in the instant matter to offer a simple, practical and feasible structural adaptation which not only aptly solves the problem but constitutes a novel contribution to the art.

In carrying out the preferred approach the signalling means for warning purposes may be either a bell or a light. This means is incorporated in a simple electric circuit wired to a battery and including an equally simple switch or circuit make an break device. A practical and easily trippable visor-like actuator is mounted in front of the forward end and in proper relationship with the roof clearance plane. Therefore, if the actuator, upon making a slow approach to the overpass, will not clear safely, the driver in the cab will be at once warned and given an opportunity to do whatever seems to be practical, which may result in taking a detour or changing his planned route.

Other objects, features and advantages will become more readily apparent from the following description and the accompanying drawing, wherein:

Fig. 1 is a fragmentary perspective view of a truck having signalling and warning means constructed in accordance with the principles of the invention and readied for use.

Fig. 2 is an enlarged view in section and elevation through one end portion of the invention removed, of course, from the truck body.

Fig. 3 is a plan view of a wiring diagram which will help to illustrate the nature of the concept.

By way of introduction to the description of the details it is to be pointed out that the invention has to do with vehicles, generally speaking, which may well be covered as trucks, trailers and the like. In the drawing in Fig. 1 the body of the "truck" is denoted by the numeral 6, the forward end being designated at 8 and the roof at 10. The driver's cab is designated by the numeral 12 and these are old and well known and need not be either shown or covered in greater detail. The invention has to do with the suitably powered truck or body having a roof and means on the forward upper portion to engage a relatively stationary barrier or overpass and, having done so, to actuate the signalling means. The visor-like actuator 14 is of any suitable construction and material and presents a leading edge 16 and a wedge or inclined plane 18. The visor is here shown as substantially hollow and has vertical end portions 20 and each end portion is the same in construction and embodies a lateral rearwardly projecting arm. The arms at the respective ends are parallel and denoted individually by the numeral 22. Each arm is pivotally mounted intermediate its ends on a suitable pivot 24 arranged, for example, in the chamber or space 26 of a horizontally disposed elongated housing 28. The housing may be of box-like form with the rear end closed at 30 and the forward end open at 32. There is a coil spring 34 bearing against cooperating end thrust members 36 and 38 whereby to normally press the end portion 40 downwardly and the visor-like actuator 14 upwardly. There is a substantially V-shaped resilient contact element 42 on the upwardly swinging end portion which is adapted to bridge the contact buttons 44 and 46 on the plate 48. This construction and arrangement serves to provide a second make and break device or switch.

In the wiring diagram seen in Fig. 3 it will be evident that the signalling alarms may be an electric lamp or light 50 constituting the visible signal or, alternatively, a simple doorbell 52 constituting the audible signal. The contacts are represented here as at 44 and 46 with the contact 44 wired at 54 to a storage battery 56 and the signal suitably wired in the manner shown. As before stated the wiring diagram is merely to assist one in obtaining a quick but nevertheless comprehensive understanding of the nature of the signal.

By mounting the device on the roof in the manner seen in Fig. 1 with the crest or highest point of elevation of the inclined plane 18 at the desired level it will be seen that the actuator becomes an advance guard, as it were, and results in bringing the signal into play in a seemingly obvious manner.

By equipping a conveyance or vehicle with the construction shown and described a satisfactory and reliable roof clearance and warning construction will be had.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle body having a forward end portion and a roof portion, a horizontally elongated actuator member having a leading edge in a plane below the plane of said roof portion and a trailing edge in a plane above the plane of said roof portion, that part of said actuator being rigid and having an inclined plane, a housing disposed at right angles to said member, at least one arm connected to said actuator and extending into and pivotally mounted in said housing, stationary contact elements mounted in said housing, and a relatively movable contact element carried by the pivoted end of said arm and movable toward and from said stationary contact elements, and a coil spring interposed between a wall of the housing and the cooperating portion of said arm.

2. An attachment for the upper forward end portion of the body of a truck comprising a visor-shaped actuating member of a length which is adapted to extend suitably and transversely across the forward end portion in a plane and position to cooperate with the top surface of the roof of said body, said member providing an inclined camming surface, a leading edge adapted to assume a position in the plane below the plane of the roof portion, and a trailing edge adapted to have a plane above the plane of the top surface of said roof portion, said actuator being provided at one end with a rearwardly and laterally disposed trip arm, said arm being connected at its forward end to one end of said actuator member, an elongated housing which is adapted to be mounted at right angles on a side portion of the body with an open forward end cooperating with an adjacent end of said member, said arm telescoping into and being pivotally mounted intermediate its ends in said housing to function within the confines of the housing, the rear end of said arm having a contact element thereon, a cooperating adjacent wall portion of said housing being provided with relatively stationary contact elements, the thus stationary movable contact elements providing a circuit make and break device to be used in opening and closing a signalling switch.

3. The structure defined in claim 2 and a second arm similar to the first arm having a forward end connected to the opposite end of said actuating member and extending at right angles to the actuating member and being parallel to the first named arm, and means for pivotally mounting said second arm on the adjacent cooperating side of the truck body.

References Cited in the file of this patent

UNITED STATES PATENTS

| | | |
|---|---|---|
| 1,625,505 | Stump et al. | Apr. 19, 1927 |
| 1,973,275 | Babson | Sept. 11, 1934 |
| 2,214,685 | Stone | Sept. 10, 1940 |
| 2,554,371 | Marx | May 22, 1951 |
| 2,567,443 | O'Meara | Sept. 11, 1951 |